Patented Feb. 18, 1930

1,747,520

UNITED STATES PATENT OFFICE

ARTHUR LÜTTRINGHAUS, OF MANNHEIM, AND PAUL NAWIASKY AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE AND PRODUCTION OF NEW VAT DYESTUFFS

No Drawing. Application filed October 3, 1927, Serial No. 223,844, and in Germany October 25, 1926.

The present invention relates to new vat dyestuffs and a process for producing the same.

We have found that anthrapyrimidone, its substitution products and derivatives are by the action of alkaline condensing agents converted into new condensation products which differ from the initial materials in their behaviour towards reducing agents and also in their property of dyeing fibres from the vat. The new products may be used as dyestuffs, and also as intermediate products in the production of other dyestuffs.

For example other new valuable vat dyestuffs may be obtained by treating the said condensation products with alkylating agents. These vat dyestuffs which are for the most part yellow, are distinguished by excellent properties as regards fastness.

All of the aforesaid products may be purified if necessary, for example, by treatment with oxidizing agents, or by recrystallization or by fractional precipitation from their solutions in concentrated sulfuric acid.

The following examples will further illustrate the nature of the said invention but the invention is not limited thereto. The parts are by weight.

Example 1

10 parts of anthrapyrimidone are introduced into a melt prepared by heating 100 parts of caustic potash and 100 parts of ethyl alcohol. The temperature is gradually raised to 180° C. and maintained at that point until the formation of the dyestuff is complete. The reddish-brown melt is poured into water, the leuco compound is oxidized by air, and the dyestuff is worked up in the usual way. The yellow-brown condensation product gives orange dyeings on cotton from a vat of the same colour. On exposure to the air, the color changes to yellow with a greenish tinge, turning red on contact with alkali. The product may be purified, by treatment with oxidizing agents such as hypochlorite, either before or after application to the fibre. The product probably corresponds to the formula:

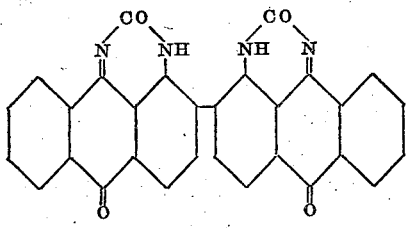

Example 2

10 part of the condensation product obtainable according to Example 1, 10 parts of p-toluene-sulfonic acid methyl ester and 10 parts of potassium carbonate are introduced into 400 parts of nitrobenzene, and heated to boiling for several hours while stirring. If the alkylation is not complete at the end of that time, it is completed by the addition of more p-toluene-sulfonic acid methyl ester and potash, and continued boiling. After cooling, the crystallized dyestuff is separated by filtration by suction and freed from solvents and by-products in the usual way. The dyestuff is a greenish-yellow crystalline powder, which gives a yellow-brown solution in sulfuric acid, and brownish-red dyeings on cotton from a vat of the same color. On exposure to the air, this color changes to a brilliant yellow extremely fast to soap and to chlorine. The dyestuff probably corresponds to the formula:

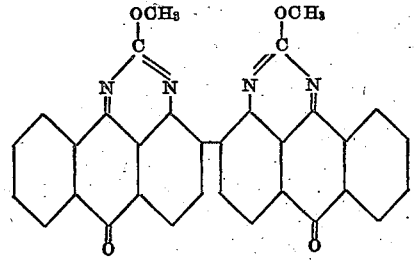

What we claim is:

1. The process of producing new vat dyestuffs which consists in subjecting anthrapyrimidones to the action of alkaline condensing agents.

2. The process of producing a new vat dyestuff which consists in heating anthrapyrimidone to 180° C. in a melt prepared from equal parts of caustic potash and ethyl alcohol.

3. As new articles of manufacture vat dyestuffs obtainable by subjecting anthrapyrimidones to the action of alkaline condensing agents.

4. As a new article of manufacture a yellowish-brown vat dyestuff giving orange dyeings on cotton from an orange vat and corresponding most probably to the formula:

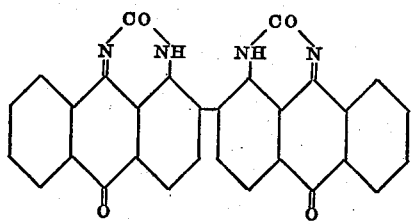

In testimony whereof we have hereunto set our hands.

ARTHUR LÜTTRINGHAUS.
PAUL NAWIASKY.
ARTUR KRAUSE.